Patented Sept. 7, 1948

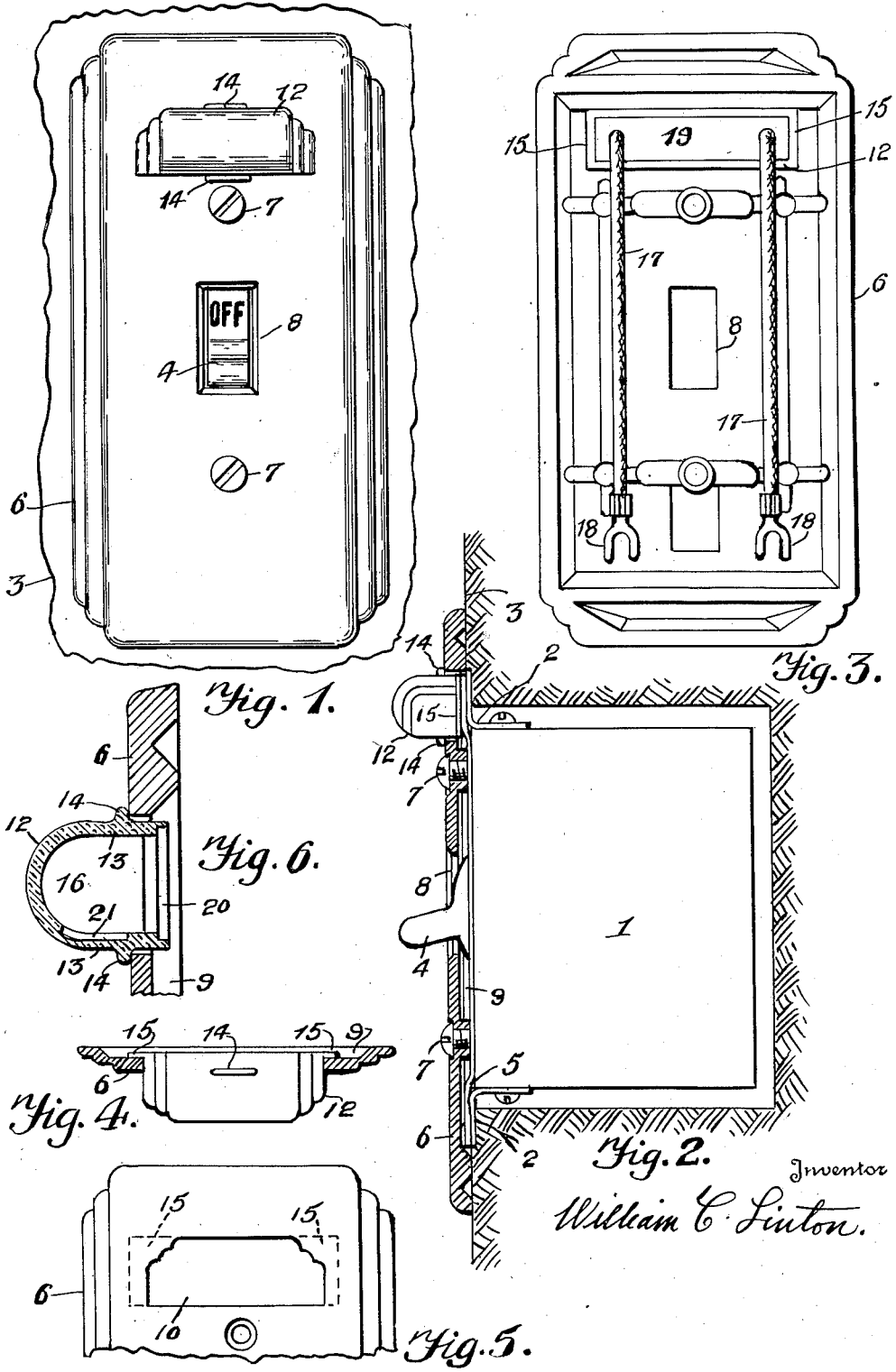

2,448,606

UNITED STATES PATENT OFFICE 2,448,606

ILLUMINATED COVER PLATE

William C. Linton, Washington, D. C.

Application February 19, 1947, Serial No. 729,503

1 Claim. (Cl. 240—2)

The present invention relates to illuminated cover plates for electrical outlets and the primary object of the invention is to provide a plate and illuminator therefor which may be more easily and conveniently applied to or removed from a standard electrical outlet.

Other objects of the invention will be in part obvious and in part pointed out hereinafter.

In order that the invention and its mode of operation may be readily understood I have in the accompanying drawings set out an embodiment of the same.

In the drawings:

Fig. 1 is a front elevation of an illuminated switch plate embodying the invention.

Fig. 2 is a vertical section through the plate as applied to a standard electrical outlet.

Fig. 3 is a rear elevation of the plate.

Fig. 4 is a horizontal section through the plate showing the lamp housing thereof in elevation.

Fig. 5 is a detail front elevation of the plate, and

Fig. 6 is an enlarged detail vertical sectional view of the plate and the lamp housing when connected together.

In the accompanying drawings I have illustrated the illuminated cover plate as applied to the conventional single toggle switch outlet, but of course it is to be understood that the cover plate may be used upon all standard electrical outlet boxes. The standard electrical outlet box 1 is suspended by means of the brackets 2 within a recess formed within the wall or other support 3. The switch arranged within the box 1 is controlled by means of knob 4 and supported within the box 1 by means of a plate 5. The bar or plate 5 is usually embedded within the wall 3 but at times the opposed ends thereof extend beyond the outer face of the wall 3 as illustrated in Fig. 2 of the drawings. The cover plate 6 extends over the outlet box and its rear face lies flush with the outer face of the wall 3. The cover plate as herein shown is a little longer than that of the standard cover plates for electrical outlets for covering the outlet box and the adjacent portions of the wall which may have become jagged or disfigured around the recess formed therein. However, the standard set screws 7 are employed for attaching the cover plate 6 to the bar or plate 5 and this plate has the usual opening 8 therein through which passes the switch knob 4. The plate 6 has a depression 9 formed in the rear face thereof for accommodating the bar 5 and other projecting parts of the outlet box.

Formed within the plate 6 is also an opening 10 which latter is at one side of the switch knob opening 8 or upon the switch plate adjacent the upper end thereof as herein shown. A lamp housing 12 is of a shape complementary to that of the opening 10 in order that the lamp housing may be inserted therethrough and be snugly fitted therein as is best illustrated in Fig. 4. The yieldable side walls 13 of the lamp housing each has formed therewith a lug extension 14 whereas the end walls of the lamp casing have the flange projections 15 formed therewith. The lamp housing is formed with a cavity 16 in which may be housed a lamp and leak resistor (not shown) which latter are connected in series with the lead wires 17 and the outer extremities of the lead wires 17 are provided with the spade terminals 18 for connection with the terminals of the switch within the box 1 whereby the lamp and resistor are connected in series with the switch terminals but in parallel with the switch thereof whereby current may be supplied through the switch when the latter is in its closed position, but when the switch is "off" or in its opened position, the current will flow to the lamp within the housing 12 as is customary in illuminators of this character. The opened end of the lamp housing may be closed by means of a fibre plate 19 seated within the recess 20 thereof and the lead wires 17 extend through this fibre plate 19.

From the foregoing it will be understood that the lamp housing 12 and the lead wires 17 are one complete assembly unit whereby the terminals 18 may be at first connected to the terminals of the switch within the box 1. Thereafter the lamp housing is inserted through the opening 10 of the plate 6 and connected thereto as best shown in Fig. 6 of the drawings. After the lamp housing is so connected to the plate 6 the knob 4 is inserted in the opening 8 thereof and the screws 7 are employed for attaching the plate 6 to the bar 5 of the outlet box.

Should the lamp housing be attached to the cover plate 6 before connecting the lead wire 17 to the terminals of the switch within the box 1 the cover plate would obstruct the view of the person installing the same and render it most difficult to so connect the lead wires unless the lead wires were made relatively long and in doing so there is usually not sufficient space within the box 1 or that between the plate 6 and box 1 to accommodate such relatively long lead wires. From the present arrangement the lead wires 17 may be substantially of the length as that illustrated in Fig. 3 and yet be readily placed between the switch box and the cover plate therefor.

When attaching the lamp housing to the plate 6 the same is inserted through the opening 10 from the rear face thereof until the lugs 14 rest upon the outer face of the plate 6. The insertion of the lamp housing through the opening 10 is limited by the flanges 15 when the latter are seated upon the rear face of the plate 6. The yieldable side walls 13 of the lamp housing permit the lugs 14 to readily pass through the opening 10 of the plate 6 and when once seated upon the outer face of the plate 6 will prevent the lamp housing from being moved inwardly of the plate unless some undue force is exerted upon the lamp housing. After the cover plate is installed over an electrical outlet as shown in Fig. 2 the switch box usually prevents the lamp housing from being moved or forced inwardly through the plate, but the switch box cannot at all times be depended upon for preventing the inward movement of the lamp housing with respect to the plate 6 as in many cases the switch box is so embedded within the wall 3 as to leave a space between the rear end of the lamp housing 12 and any projecting parts of the switch casing 1. The lamp housing is preferably molded of translucent materials and a recess 21 is molded within the inner face thereof whereby the rays of light from a lamp within the housing will be projected down over the plate 6 upon the knob 4 projecting therethrough. From the construction of this lamp housing only a very dim light can be observed through the dome-shaped portion thereof and yet a stronger light may be observed from the knob 4 all without causing any undue light within a dark room.

The plate 6 as herein shown is molded from opaque materials preferably of the design as shown so as to completely cover from view the electrical outlet and the lamp housing is molded from translucent materials of the same or different color from that of the cover plate.

I claim:

In a device of the character described comprising in combination a cover plate having an opening formed therethrough for receiving an electrical device, said cover plate having an elongated opening formed therethrough, a lamp housing assembly unit comprising a casing, a portion of the casing of said lamp housing being compatible in design with that of the elongated opening within said cover plate as to be inserted therethrough and snugly fit therein, whereby the rays of light from a lamp within said housing may emit therefrom and be projected towards the opening formed within said cover plate receiving the electrical device, laterally extending flanges formed with said lamp housing and engageable with one face of said cover plate, a pair of yieldable walls formed with said lamp housing and a knob formed with each of said walls for engagement with the opposed face of said cover plate.

WILLIAM C. LINTON.

REFERENCES CITED

The following references are of record in the file of this patent:

UNITED STATES PATENTS

| Number | Name | Date |
|---|---|---|
| 1,237,359 | Marriott et al. | Aug. 21, 1917 |
| 2,260,894 | Field | Oct. 28, 1941 |